(12) United States Patent
Bach et al.

(10) Patent No.: US 12,704,865 B2
(45) Date of Patent: Aug. 11, 2026

(54) METHOD AND APPARATUS FOR IDENTIFYING PROPER REGULATION METHOD BASED ON AVERAGE VOLTAGE CHANGE BETWEEN TAP STEPS FOR VOLTAGE REGULATORS

(71) Applicant: Hubbell Incorporated, Shelton, CT (US)

(72) Inventors: Lawrence Deward Bach, St. Petersburg, FL (US); Theodore Clifford Murphy, St. Petersburg, FL (US)

(73) Assignee: Hubbell Incorporated, Shelton, CT (US)

( * ) Notice: Subject to any disclaimer, the term of this patent is extended or adjusted under 35 U.S.C. 154(b) by 183 days.

(21) Appl. No.: 18/807,501

(22) Filed: Aug. 16, 2024

(65) Prior Publication Data

US 2025/0068196 A1 Feb. 27, 2025

Related U.S. Application Data

(60) Provisional application No. 63/578,445, filed on Aug. 24, 2023.

(51) Int. Cl.
*G05F 1/14* (2006.01)
*H02J 3/12* (2026.01)

(52) U.S. Cl.
CPC . *G05F 1/14* (2013.01); *H02J 3/12* (2013.01)

(58) Field of Classification Search
CPC .................................... G05F 1/14; H02J 3/12
See application file for complete search history.

(56) References Cited

U.S. PATENT DOCUMENTS 5,821,716 A 10/1998 Okanik
10,732,656 B2 * 8/2020 Tyler ......................... G05F 1/66
2007/0222421 A1 * 9/2007 Labuschagne ............ G05F 1/14 323/255
2013/0307494 A1 * 11/2013 Meinecke ................ G05F 1/70 323/205
2014/0055225 A1 * 2/2014 Rosado .................. H01H 9/548 336/150
2023/0066436 A1 3/2023 Rutkowski

OTHER PUBLICATIONS

PCT/US2024/042760 International Search Report and Written Opinion dated Nov. 1, 2024 (11 pages).

* cited by examiner

*Primary Examiner* — Jue Zhang
(74) *Attorney, Agent, or Firm* — Michael Best & Friedrich LLP

(57) ABSTRACT

Identifying proper regulation method based on average voltage change between tap steps for voltage regulators. In response to a first tap step index being different from a second tap step index of a preceding tap operation, an electronic processor determines whether an average of a first voltage change of the current tap operation and a second voltage change of the preceding tap operation satisfies a voltage threshold. The electronic processor is configured to change a regulation direction of the voltage regulator when the average satisfies the voltage threshold and maintain the regulation direction of the voltage regulator when the average does not satisfy the voltage threshold. The electronic processor is configured to provide regulation settings to the voltage regulator corresponding to a current regulation mode and regulation direction of the voltage regulator.

20 Claims, 10 Drawing Sheets

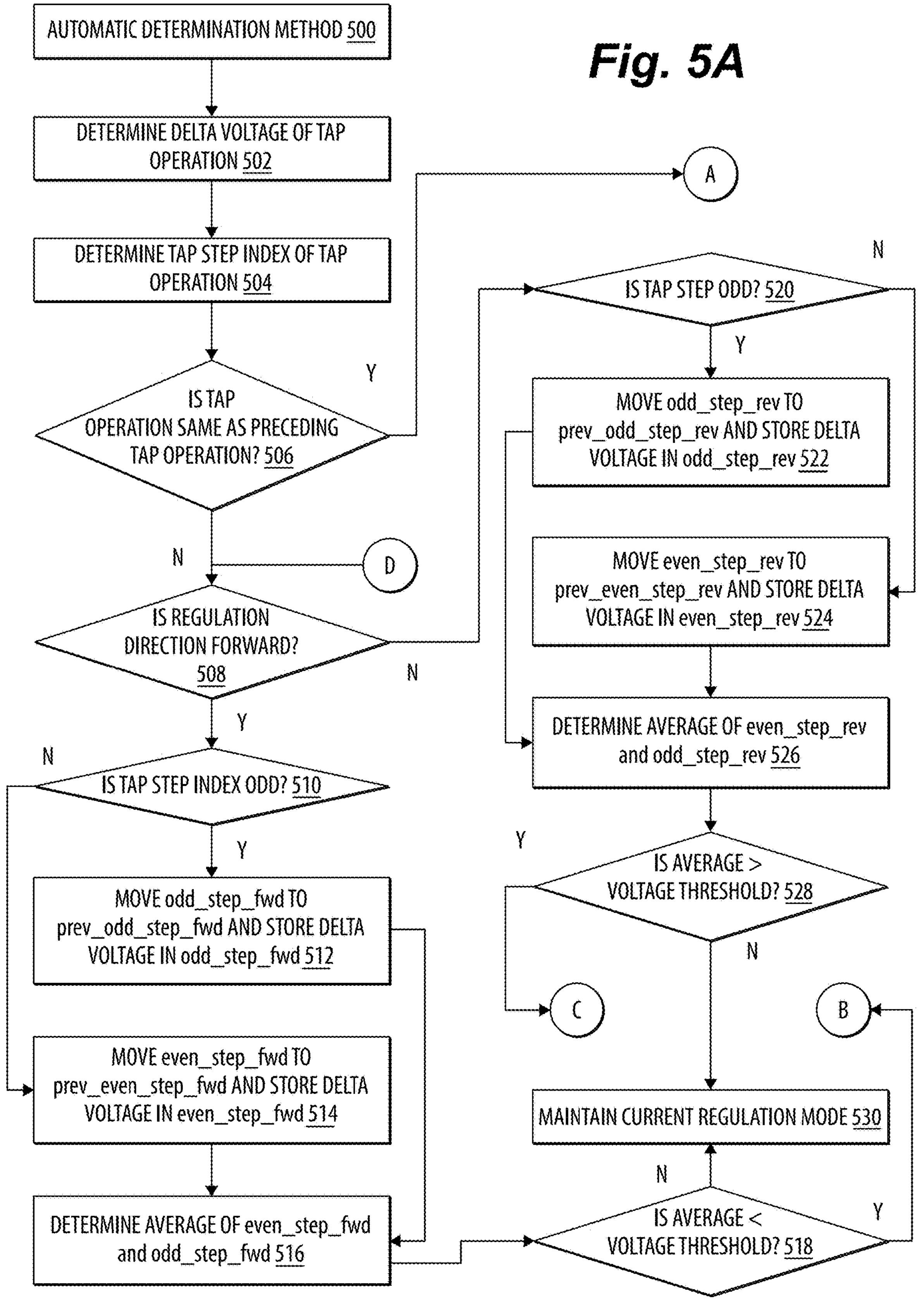

AUTOMATIC DETERMINATION METHOD 500
Fig. 5A
DETERMINE DELTA VOLTAGE OF TAP OPERATION 502
A
DETERMINE TAP STEP INDEX OF TAP OPERATION 504
N
IS TAP STEP ODD? 520
Y
IS TAP OPERATION SAME AS PRECEDING TAP OPERATION? 506
Y
MOVE odd_step_rev TO prev_odd_step_rev AND STORE DELTA VOLTAGE IN odd_step_rev 522
N
D
MOVE even_step_rev TO prev_even_step_rev AND STORE DELTA VOLTAGE IN even_step_rev 524
IS REGULATION DIRECTION FORWARD? 508
N
Y
DETERMINE AVERAGE OF even_step_rev and odd_step_rev 526
N
IS TAP STEP INDEX ODD? 510
Y
Y
IS AVERAGE > VOLTAGE THRESHOLD? 528
MOVE odd_step_fwd TO prev_odd_step_fwd AND STORE DELTA VOLTAGE IN odd_step_fwd 512
N
C
B
MOVE even_step_fwd TO prev_even_step_fwd AND STORE DELTA VOLTAGE IN even_step_fwd 514
MAINTAIN CURRENT REGULATION MODE 530
N
Y
DETERMINE AVERAGE OF even_step_fwd and odd_step_fwd 516
IS AVERAGE < VOLTAGE THRESHOLD? 518

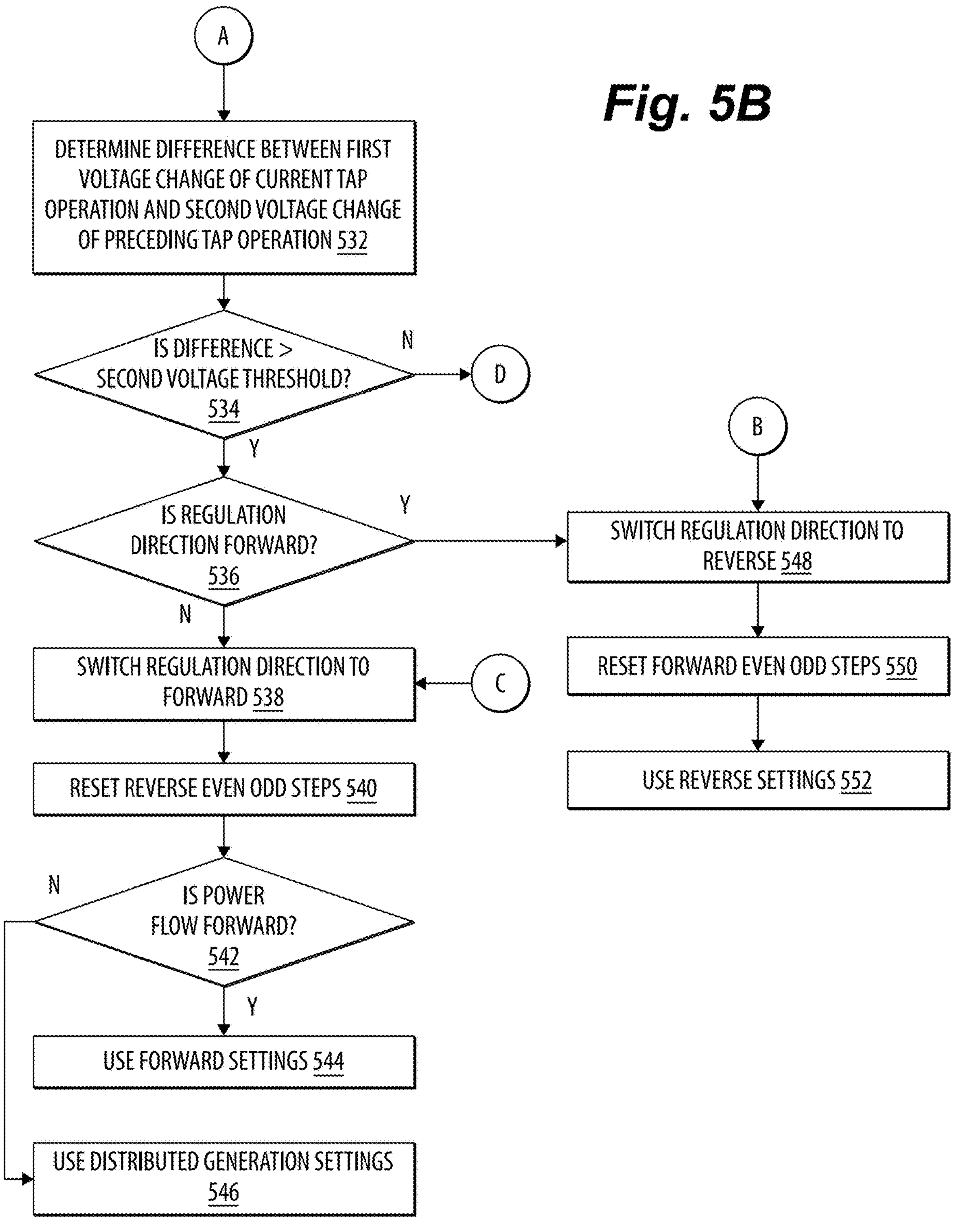
A
Fig. 5B
DETERMINE DIFFERENCE BETWEEN FIRST VOLTAGE CHANGE OF CURRENT TAP OPERATION AND SECOND VOLTAGE CHANGE OF PRECEDING TAP OPERATION 532
IS DIFFERENCE > SECOND VOLTAGE THRESHOLD? 534
N
D
Y
B
IS REGULATION DIRECTION FORWARD? 536
Y
SWITCH REGULATION DIRECTION TO REVERSE 548
N
SWITCH REGULATION DIRECTION TO FORWARD 538
C
RESET FORWARD EVEN ODD STEPS 550
USE REVERSE SETTINGS 552
RESET REVERSE EVEN ODD STEPS 540
N
IS POWER FLOW FORWARD? 542
Y
USE FORWARD SETTINGS 544
USE DISTRIBUTED GENERATION SETTINGS 546

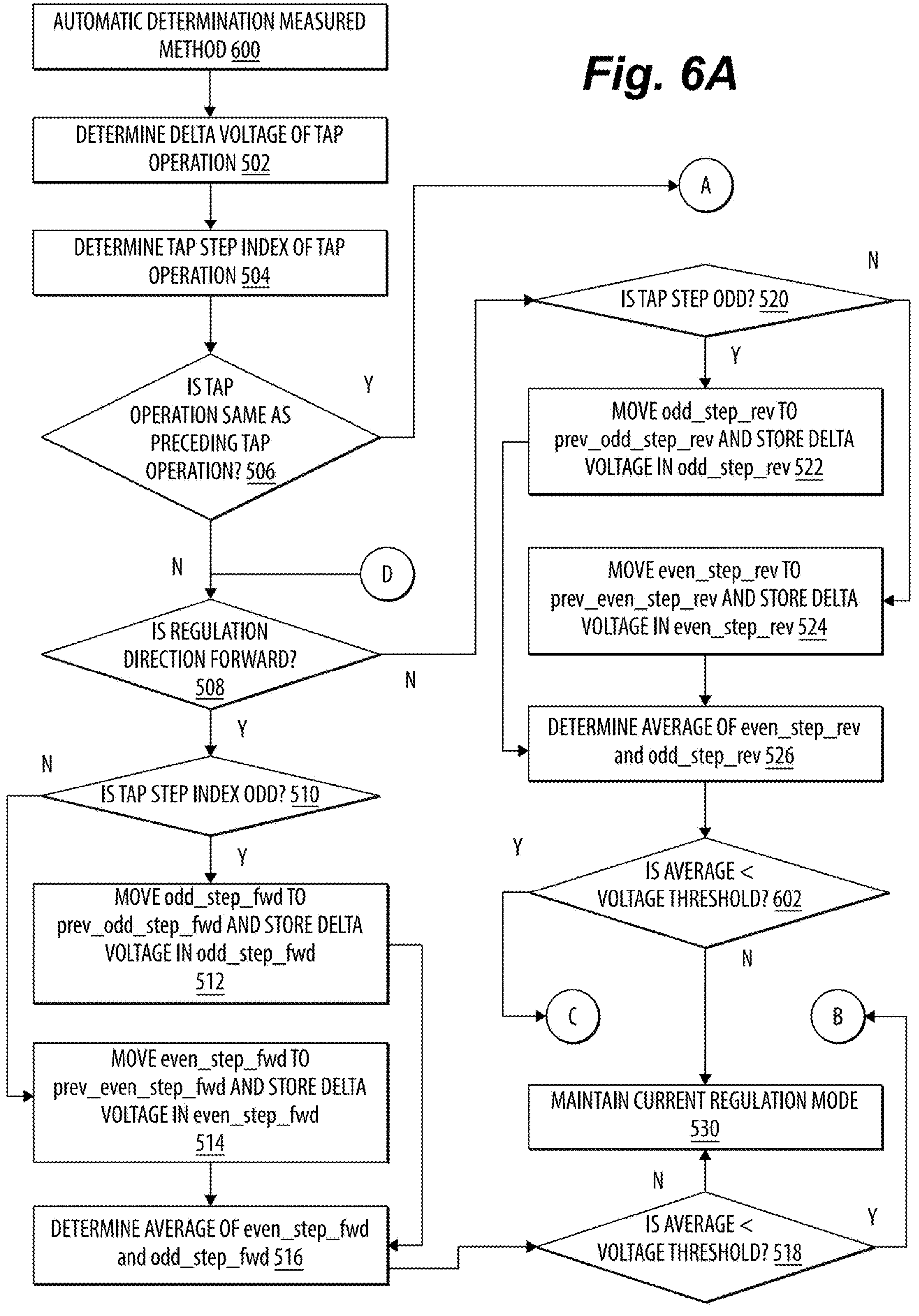

Fig. 6A
AUTOMATIC DETERMINATION MEASURED METHOD 600
DETERMINE DELTA VOLTAGE OF TAP OPERATION 502
DETERMINE TAP STEP INDEX OF TAP OPERATION 504
IS TAP OPERATION SAME AS PRECEDING TAP OPERATION? 506
Y
A
N
D
IS REGULATION DIRECTION FORWARD? 508
N
Y
IS TAP STEP INDEX ODD? 510
N
Y
MOVE odd_step_fwd TO prev_odd_step_fwd AND STORE DELTA VOLTAGE IN odd_step_fwd 512
MOVE even_step_fwd TO prev_even_step_fwd AND STORE DELTA VOLTAGE IN even_step_fwd 514
DETERMINE AVERAGE OF even_step_fwd and odd_step_fwd 516
IS TAP STEP ODD? 520
N
Y
MOVE odd_step_rev TO prev_odd_step_rev AND STORE DELTA VOLTAGE IN odd_step_rev 522
MOVE even_step_rev TO prev_even_step_rev AND STORE DELTA VOLTAGE IN even_step_rev 524
DETERMINE AVERAGE OF even_step_rev and odd_step_rev 526
IS AVERAGE < VOLTAGE THRESHOLD? 602
Y
N
C
B
MAINTAIN CURRENT REGULATION MODE 530
N
IS AVERAGE < VOLTAGE THRESHOLD? 518
Y

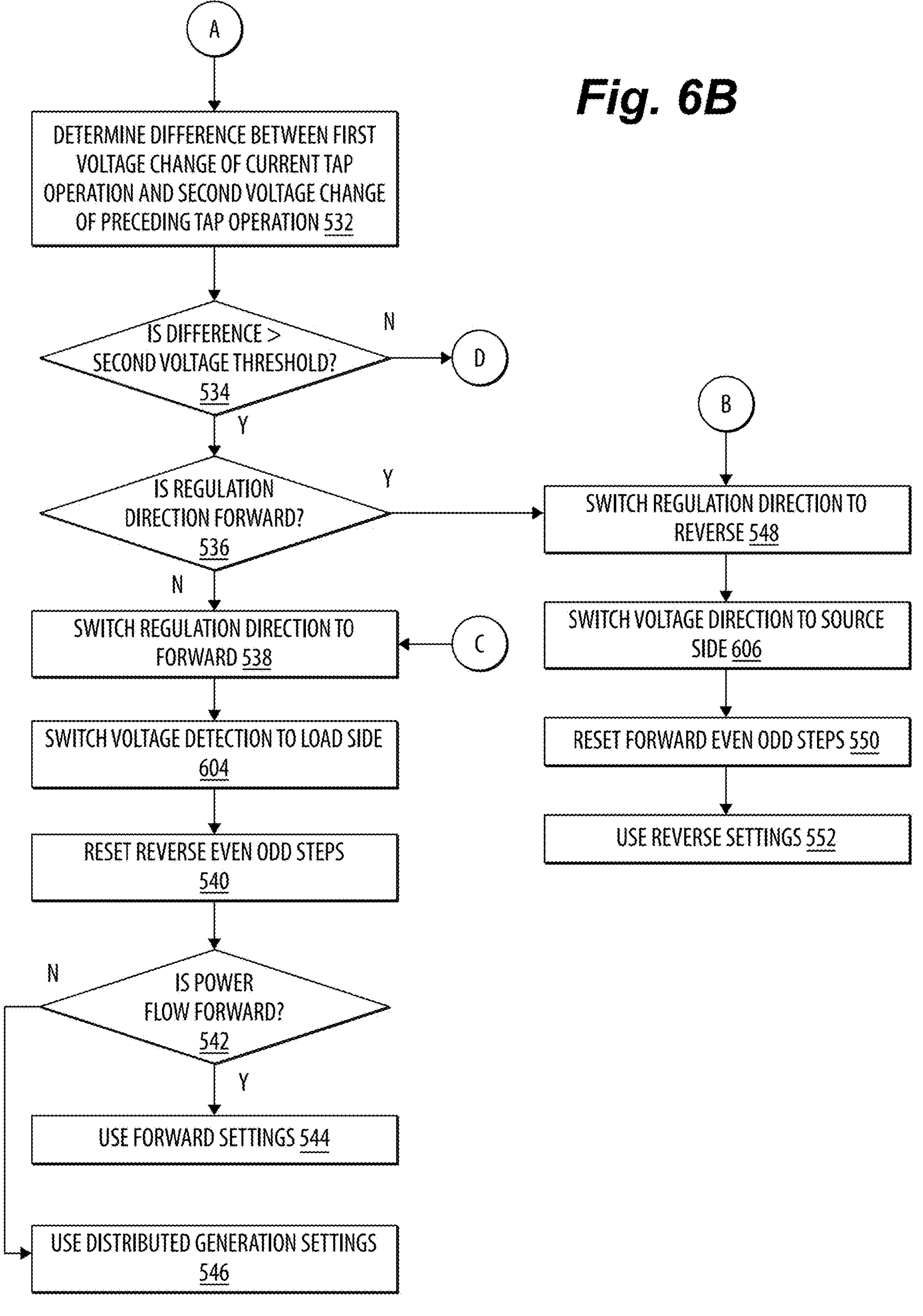
A
Fig. 6B
DETERMINE DIFFERENCE BETWEEN FIRST VOLTAGE CHANGE OF CURRENT TAP OPERATION AND SECOND VOLTAGE CHANGE OF PRECEDING TAP OPERATION 532
IS DIFFERENCE > SECOND VOLTAGE THRESHOLD? 534
N
D
Y
B
IS REGULATION DIRECTION FORWARD? 536
Y
SWITCH REGULATION DIRECTION TO REVERSE 548
N
SWITCH REGULATION DIRECTION TO FORWARD 538
C
SWITCH VOLTAGE DIRECTION TO SOURCE SIDE 606
SWITCH VOLTAGE DETECTION TO LOAD SIDE 604
RESET FORWARD EVEN ODD STEPS 550
USE REVERSE SETTINGS 552
RESET REVERSE EVEN ODD STEPS 540
N
IS POWER FLOW FORWARD? 542
Y
USE FORWARD SETTINGS 544
USE DISTRIBUTED GENERATION SETTINGS 546

METHOD AND APPARATUS FOR IDENTIFYING PROPER REGULATION METHOD BASED ON AVERAGE VOLTAGE CHANGE BETWEEN TAP STEPS FOR VOLTAGE REGULATORS

RELATED APPLICATION

This application claims priority to U.S. Provisional Patent Application No. 63/578,445, filed Aug. 24, 2023, the entire contents of which are hereby incorporated by reference.

FIELD

The present disclosure relates generally to voltage regulation for power distribution systems. Specifically, the present disclosure relates to identifying a proper regulation method for a voltage regulator.

SUMMARY

Some embodiments provide a voltage regulator controller for controlling a voltage regulator of a power distribution system. The voltage regulator controller includes an electronic processor configured to, in response to the first tap step index being different from a second tap step index of a preceding tap operation determine whether an average of a first voltage change of the current tap operation and a second voltage change of the preceding tap operation satisfies a voltage threshold. In response to the first tap step index being different from a second tap step index of a preceding tap operation, the electronic processor is also configured to change a regulation direction of the voltage regulator when the average satisfies the voltage threshold and maintain the regulation direction of the voltage regulator when the average does not satisfy the voltage threshold. The electronic processor is further configured to provide regulation settings to the voltage regulator corresponding to a current regulation mode and regulation direction of the voltage regulator.

In some aspects, the first tap step index and the second tap step index indicate whether a corresponding tap step was even or odd. Each alternative tap step of the voltage regulator are denoted as odd tap steps and remaining tap steps of the voltage regulator are denoted as even tap steps.

In some aspects, the electronic processor is configured to, when changing the regulation direction from a reverse direction to a forward direction, determine a direction of power flow. When changing the regulation direction from a reverse direction to a forward direction, the electronic processor is also configured to provide forward regulation mode settings to the voltage regulator when the power flow direction is forward and provide distributed generation mode settings to the voltage regulator when the power flow direction is reverse.

In some aspects, the regulation settings include one or more selected from a group consisting of a band center voltage, a band width of voltage regulation, a line drop compensation resistance, and a line drop compensation reactance.

In some aspects, the voltage threshold is a first voltage threshold. The electronic processor is configured to, in response to the first tap step index being same as the second tap step index, determine whether a difference between the first voltage change and the second voltage change satisfies a second voltage threshold. The electronic processor is further configured to change the regulation direction of the voltage regulator when the difference satisfies the second voltage threshold. The electronic processor is also configured to, when the difference does not satisfy the second voltage threshold, determine whether the average satisfies the first voltage threshold. The electronic processor is further configured to change the regulation direction of the voltage regulator when the average satisfies the first voltage threshold and maintain the regulation direction of the voltage regulator when the average does not satisfy the first voltage threshold.

In some aspects, the electronic processor is configured to switch a voltage measurement side of the voltage regulator when changing the regulation direction.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the application will become apparent by consideration of the detailed description and accompanying drawings.

BRIEF DESCRIPTION OF THE DRAWINGS

FIGS. 5A and 5B illustrate a flowchart of a method for identifying proper regulation method for voltage regulators according to some embodiments.

FIGS. 6A and 6B illustrate a flowchart of a method for identifying proper regulation method for voltage regulators according to some embodiments.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1A:
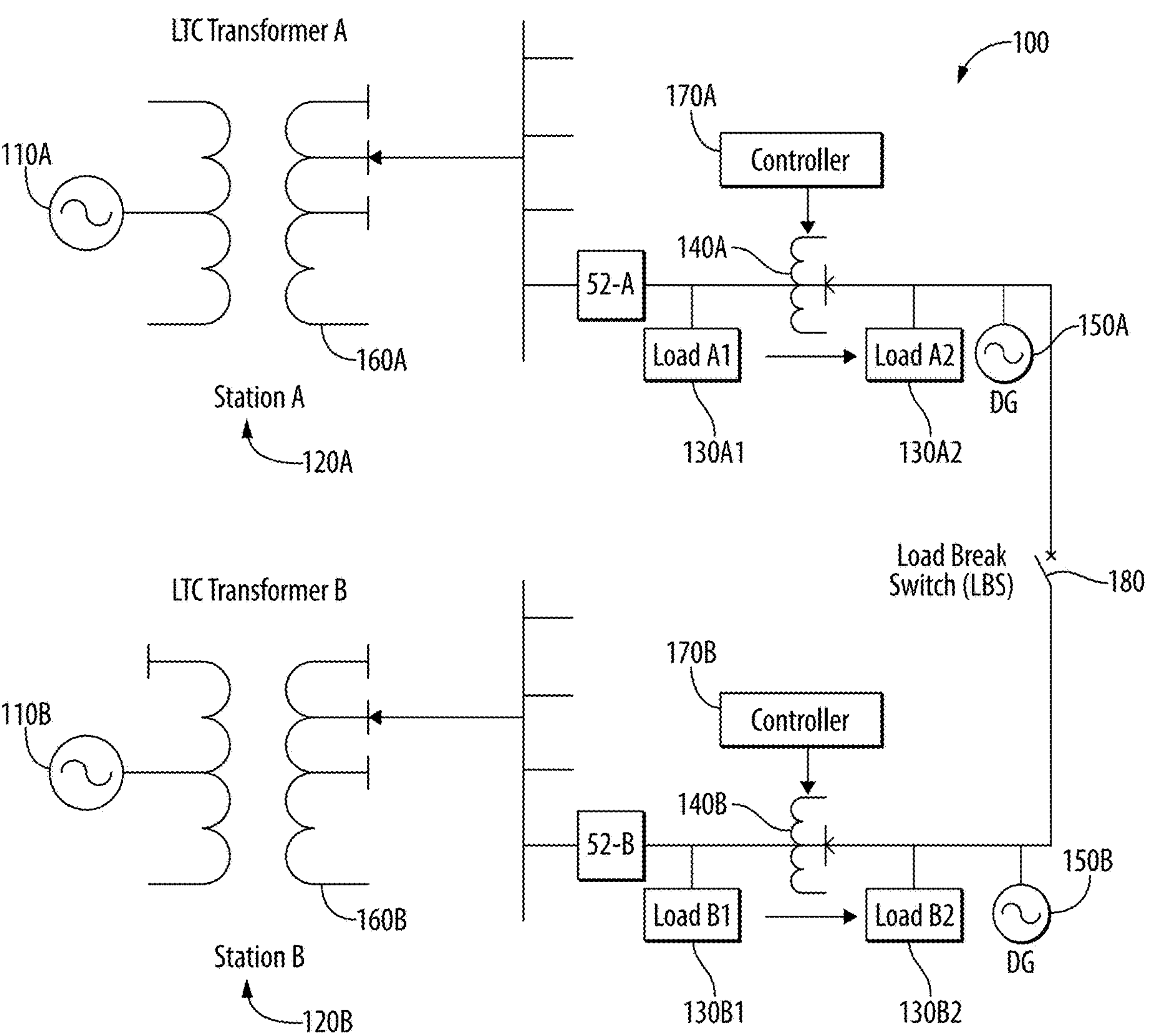
FIGS. 1A-1C are block diagrams of a power distribution system according to some embodiments.
Figure 1B:
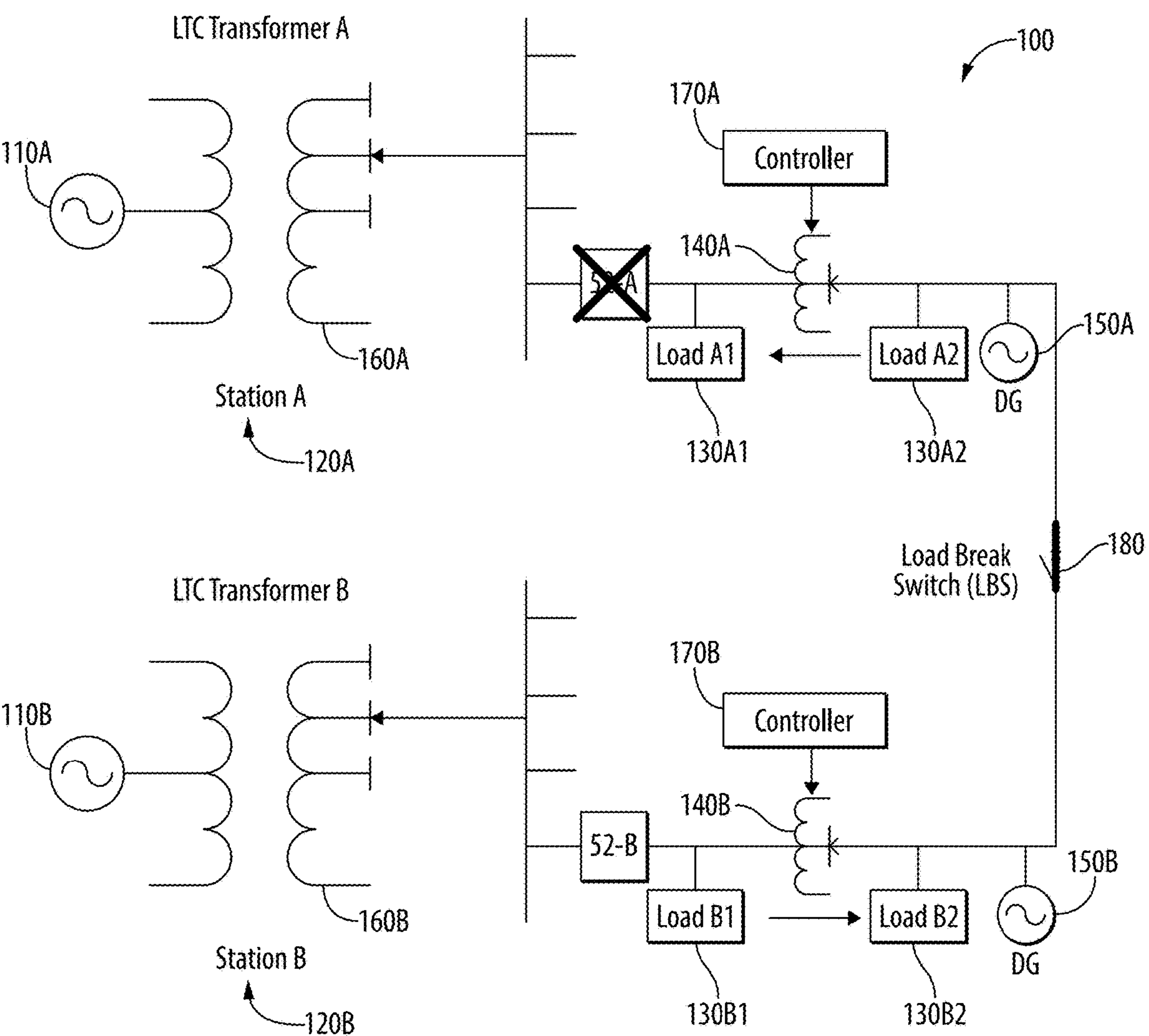
Figure 1C:
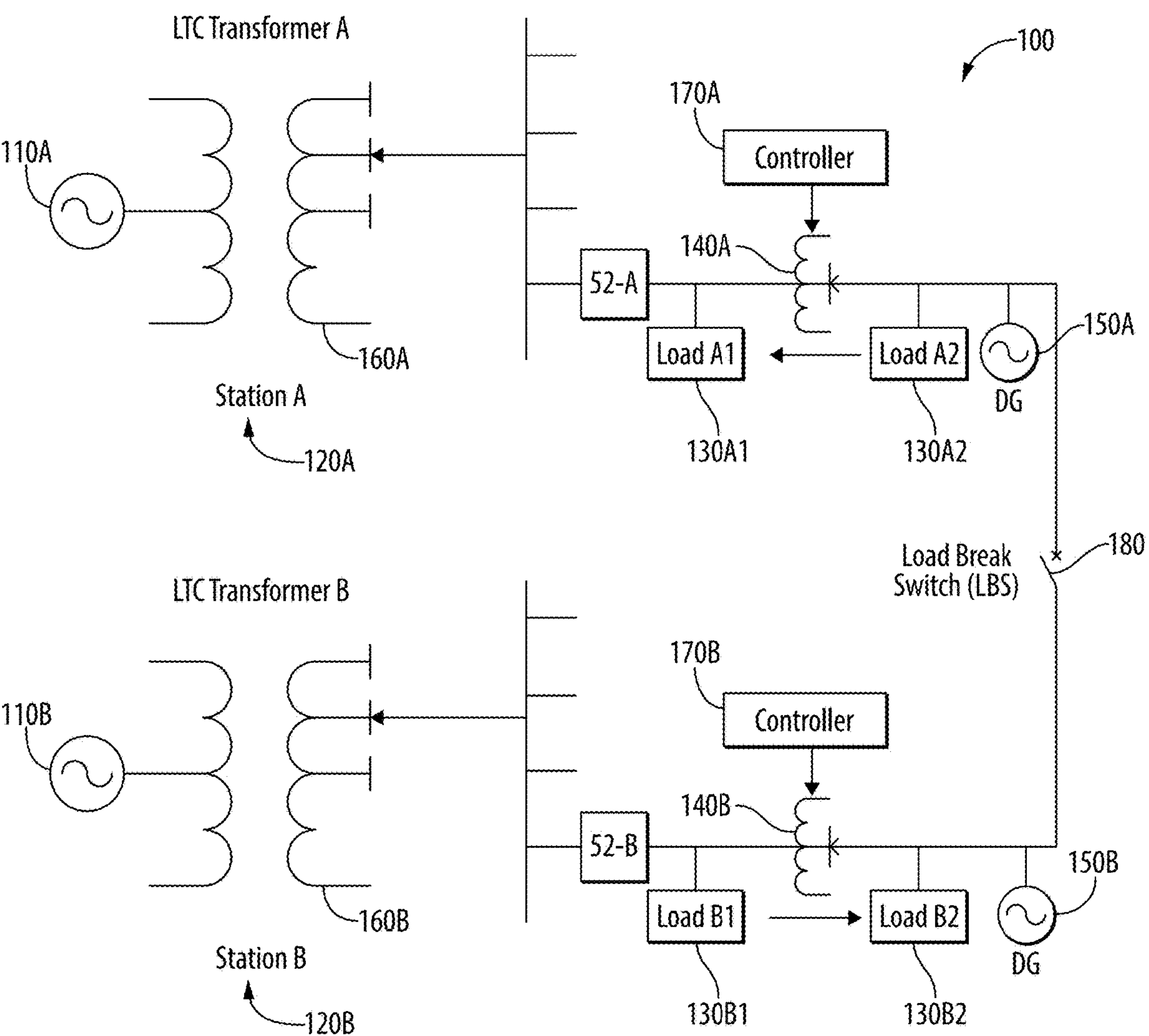

FIGS. 1A-1C illustrate simplified block diagrams of an example embodiment of a power distribution system 100. In the example illustrated, the power distribution system 100 includes a plurality of power sources 110 (for example, a first power source 110A and a second power source 110B), a plurality of distribution substations 120 (for example, a first distribution substation 120A and a second distribution substation 120B), a plurality of loads 130, a plurality of voltage regulators 140 (for example first voltage regulator 140A and a second voltage regulator 140B), and a plurality of distributed generators 150 (for example, a first distributed generator 150A and a second distributed generator 150B). The plurality of power sources 110 may include power generating plants supplying power for distribution by a utility company. The distribution substations 120 receive electrical power generated by the power sources 110 and distribute the electrical power to the plurality of loads 130. The distribution substations 120 may receive the power at high voltages and include a transformer 160 (for example, a first transformer 160A and a second transformer 160B) to convert the high voltage to a sufficiently lower voltage for distribution. The transformers 160 may include load tap changing (LTC) transformers, or other types of transformers. The plurality of loads 130 include, for example, residential facilities, commercial facilities, public facilities, or the like. The plurality of distributed generators 150 may include local power generators (e.g., solar panels, or the like) that are used to power the loads 130. Excess power generated by the distributed generators 150 may be fed back into the power grid.

The plurality of voltage regulators 140 are provided between the plurality of distributed generators 150 and the plurality of loads 130 to regulate the power (for example, voltage) and deliver power within appropriate voltage limits. The plurality of voltage regulators 140 may be singularly referred to as a voltage regulator 140. The voltage regulator 140 may be a tap changing regulator (for example, a tap step voltage regulator). In one example, the voltage regulator 140 may include a transformer whose windings may be altered using tap changing operations to increase or decrease the output voltage of the voltage regulator 140. In another example, tap changing operations of the voltage regulator 140 affect the impedance of the voltage regulator 140 thereby increasing or decreasing the output voltage of the voltage regulator 140. A voltage regulator controller 170 is provided with the voltage regulator 140, for example, to control the tap changing operation of the voltage regulator 140, to control the modes of operation of the voltage regulator 140, to display information relating to the voltage regulator 140, and/or the like.

A normally-open load break switch 180 may be provided between the loads 130 of the different distribution substations 120. Typically, electric power flows from each distribution substations 120 to the loads 130 connected between the distribution substation 120 and the load breaking switch 180 as shown in FIG. 1A (for example, a first operating condition). For example, the electric power from distribution substation 120A flows to loads 130A1 and 130A2 and the electric power from distribution substation 120B flows to loads 130B1 and 130B2. In normal operating condition, power flow through the voltage regulators 140 is in a forward direction (that is, from left to right of FIG. 1A).

The load breaking switch 180 may be closed during a failure condition of one of the distribution substation 120 to allow power from a different distribution substation 120 to power the loads 130 of the failed distribution substation 120. For example, when the distribution substation 120A fails, the load breaking switch 180 may be closed to power the loads 130A1 and 130A2 using the distribution substation 120B (for example, a second operating condition). FIG. 1B illustrates this second operating condition. In the second operating condition, power flow through the first voltage regulator 140A is in a reverse direction (that is, from right to left of FIG. 1B). Additionally, during a light load period, the distributed generators 150 may keep generating power. In these conditions, the power flow on the voltage regulators 140 may be reduced and ultimately reversed. FIG. 1C illustrates this distributed generation operating condition (for example, a third operating condition). In the distributed generation operating condition, the power flow through the first regulator 140A, for example, is in a reverse direction (that is, from right to left of FIG. 1C). The voltage regulators 140 may be operated using different regulating modes in each of the above-noted operating conditions of the power distribution system 100. The voltage regulator controller 170 may determine the operating condition of the power distribution system 100 and control a regulation mode of the voltage regulator 140.

The power distribution system 100 may include more or fewer components in a similar or dissimilar configuration than illustrated in FIGS. 1A-1C. For example, a single power source 110, substation 120, and voltage regulator 140 may be used to power the loads 130 and the power distribution system 100 may not include distributed generators 150.

Figure 2:
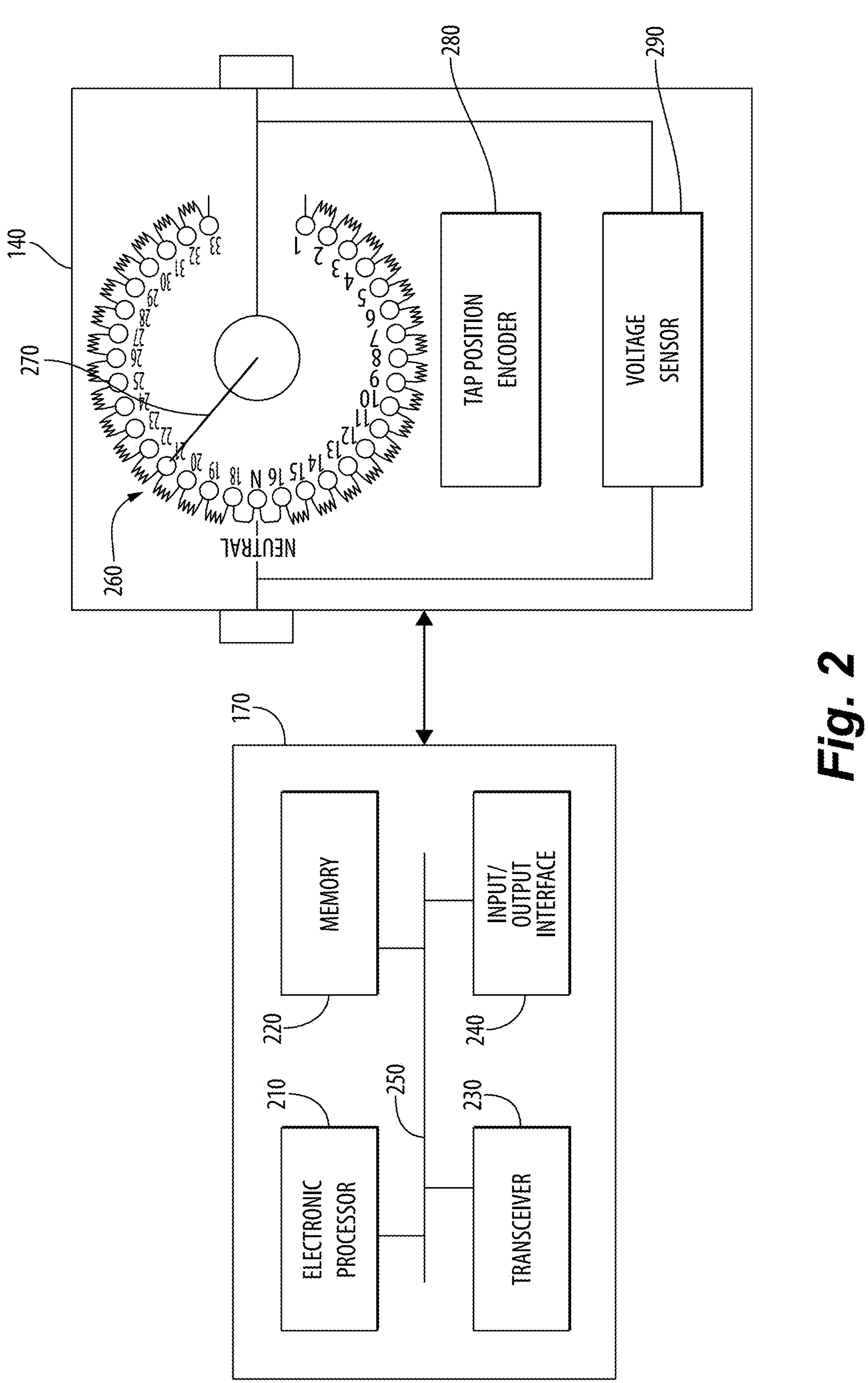
FIG. 2 is a block diagram of a voltage regulator controller and a voltage regulator of the power distribution system of FIGS. 1A-1C according to some embodiments.

FIG. 2 is a simplified block diagram of an example embodiment of voltage regulator controller 170 and the voltage regulator 140. In the example illustrated, the voltage regulator controller 170 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). The voltage regulator 140 may include more or fewer components than those illustrated in FIG. 2.

In some examples, the electronic processor 210 is implemented as a microprocessor with separate memory, such as the memory 220. In other examples, the electronic processor 210 may be implemented as a micro-controller (with the memory 220 on the same chip). In other examples, the electronic processor 210 may be implemented using multiple processors. In addition, the electronic processor 210 may be implemented partially or entirely as, for example, a field-programmable gate array (FPGA), an application specific integrated circuit (ASIC), and the like, and the memory 220 may not be needed or may be modified, accordingly. In the example illustrated, the memory 220 includes non-transitory, computer-readable memory that stores instructions that are received and executed by the electronic processor 210 to carry out the functionality of the voltage regulator controller 170 described herein. The memory 220 may include, for example, a program storage area and a data storage area. The program storage area and the data storage area may include combinations of different types of memory, such as read-only memory and random-access memory.

The transceiver 230 allow for wired/wireless communication between the voltage regulator controller 170 and an external device, for example, a monitoring device of a utility or the like. The transceiver 230 also allows for communication with and control of the voltage regulator 140, for example, over a wired connection. In some examples, the transceiver 230 includes separate transceiver and receiver components. The input/output interface 240 includes one or more input units (for example, buttons, controls, or the like), one or more output units (for example, a display, a speaker, or the like), or a combination input/output unit (for example, a touch-screen display, or the like). The input/output interface 240 may also be connected to the voltage regulator 140 to control the operation of the voltage regulator 140.

The voltage regulator 140 may include a winding 260 and a tap 270 configured to be moved along the winding 260. The winding 260 includes a plurality of tap positions where the tap 270 may connect to (or come to rest on) the winding 260. In the example illustrated, the winding 260 may include thirty-three (33) tap positions including a neutral tap position, sixteen (16) positions to raise the voltage, and sixteen (16) positions to lower the voltage. In other examples, the winding 260 may include additional or fewer positions based on the desired configuration for the power distribution system 100. The position of the tap 270 (referred to as a tap position) is changed on the winding, for example, using a tap changer to regulate the output voltage. The tap changer may be an actuator, for example, a motor or the like that can physically move the tap between the different tap positions. The voltage regulator 140 is typically designed to regulate the output voltage between +/−10% of the source voltage. In the United States, the desired alternating current (AC) voltage for power distribution systems 100 is 120 Volts. Therefore, the voltage regulator 140 may regulate between 108 Volts and 132 Volts. Each tap position change in the thirty-three-tap voltage regulator 140 may result in a change of approximately 0.75 Volts on the regulated side. The tap position change may be referred to as a tap step such that thirty-three tap positions result in 32 tap steps. Each tap step therefore results in a change of approximately 0.75 Volts. The tap steps may be assigned an index. In one example, each tap step may be considered an even tap step or an odd tap step, where even and odd refer to the tap step index. Every alternative tap step of the winding 260 may be referred to as an even tap step and the remaining tap steps of the winding 260 may be referred to as odd tap step. For example, tap steps 1↔2, 3↔4, and so on may be considered as even tap steps and tap steps 2↔3, 4↔5, and so on may be considered as odd tap steps. The tap step may be considered even regardless of whether the tap position moves 1→2 or 2→1 (3→4 or 4→3, and so on). In other examples, different labels may be used to refer to a tap step index other than even or odd. The tap step index is used to determine whether two consecutive tap steps resulted in the tap 270 returning to the same tap position (for example, 1→2 then 2→1).

The voltage regulator 140 may include a tap position encoder 280 (for example, a Selsyn Indicator) to track the tap position and provide the tap position information to the voltage regulator controller 170. In some examples, other known methods may be used to track the tap position. The voltage regulator 140 may also include a voltage sensor 290 to measure the voltage on one or both of the source side and the load side of the voltage regulator. The voltage sensor 290 may provide voltage signals indicating the measured voltage to the voltage regulator controller 170. Although illustrated as being provided in the voltage regulator 140, the tap position encoder 280 and the voltage sensor 290 may be provided in the voltage regulator controller 170.

Power may flow in either direction through the voltage regulator 140. When power is flowing from the source side to the load side, the power flow is in the forward direction. When power is flowing from the load side to the source side, the power flow is in the reverse direction. The voltage regulator 140 has several regulation modes including, for example, a forward regulation mode, a reverse regulation mode, and a distributed generation regulation mode. In both the forward regulation mode and the distributed generation regulation mode, the regulation direction is forward direction. That is, in both forward regulation mode and the distributed generation regulation mode, the voltage regulator 140 aims to keep the load side voltage at the desired level. In the reverse regulation mode, the regulation direction is reverse direction. That is, in the reverse regulation mode, the voltage regulator 140 aims to keep the source side voltage at the desired level. In the forward regulation mode, the power flow is in the forward direction. In the reverse regulation mode and the distributed generation regulation mode, the power flow is in the reverse direction.

Returning to FIGS. 1A-1C, the regulation mode of the voltage regulator 140 may need to be switched when the operating condition of the power distribution system 100 changes as discussed above. For example, the voltage regulator 140 may be switched to operate in three regulation modes: (i) a forward regulation mode (e.g., FIG. 1A); (ii) a reverse regulation mode (e.g., FIG. 1B); and (iii) a distributed generation mode (e.g., FIG. 1C) based on the respective operating condition change of the power distribution system 100. The regulation direction may be different from the direction of the power flow. For example, the power flow is in the reverse direction (i.e., from right to left of FIG. 1C) in the distributed generation mode. However, the voltage regulator 140 regulates in the forward direction (i.e., from left to right of FIG. 1C) in the distributed generation mode. In the forward regulation mode and the reverse regulation mode, the power flow direction and the regulation direction may be the same.

Returning to FIG. 2, the voltage regulator controller 170 may automatically determine an operating condition to identify the proper regulation method to be used by the voltage regulator 140. A change in operating condition may be determined by detecting the voltage on the regulated side of the voltage regulator 140. For example, when the voltage regulator is operating in the forward regulation mode (e.g., as in FIG. 1A) and the operating condition is switched to the reverse regulation mode (e.g., as in FIG. 1B), then a change in tap position will not result in a voltage change on the regulated side of the voltage regulator 140. That is, the voltage sensor 290 may detect a voltage change of zero (0) volts or less than 0.7 Volts on the load side of the voltage regulator 140. Accordingly, to detect a change in operation condition, the voltage change before and after a tap operation on a regulated side may be compared to a voltage change threshold (for example, 0.7 Volts). When the voltage change is below the voltage change threshold, then the operation condition is determined to have changed. However, due to practical consideration such as the age of the voltage regulator 140 or construction of the voltage regulator 140, the voltage change for each tap step may be as low as about 0.4 Volts and as high as about 1.0 Volts. Accordingly, the above-noted method may not be accurate or quick in identifying the proper regulation method.

Figure 3:
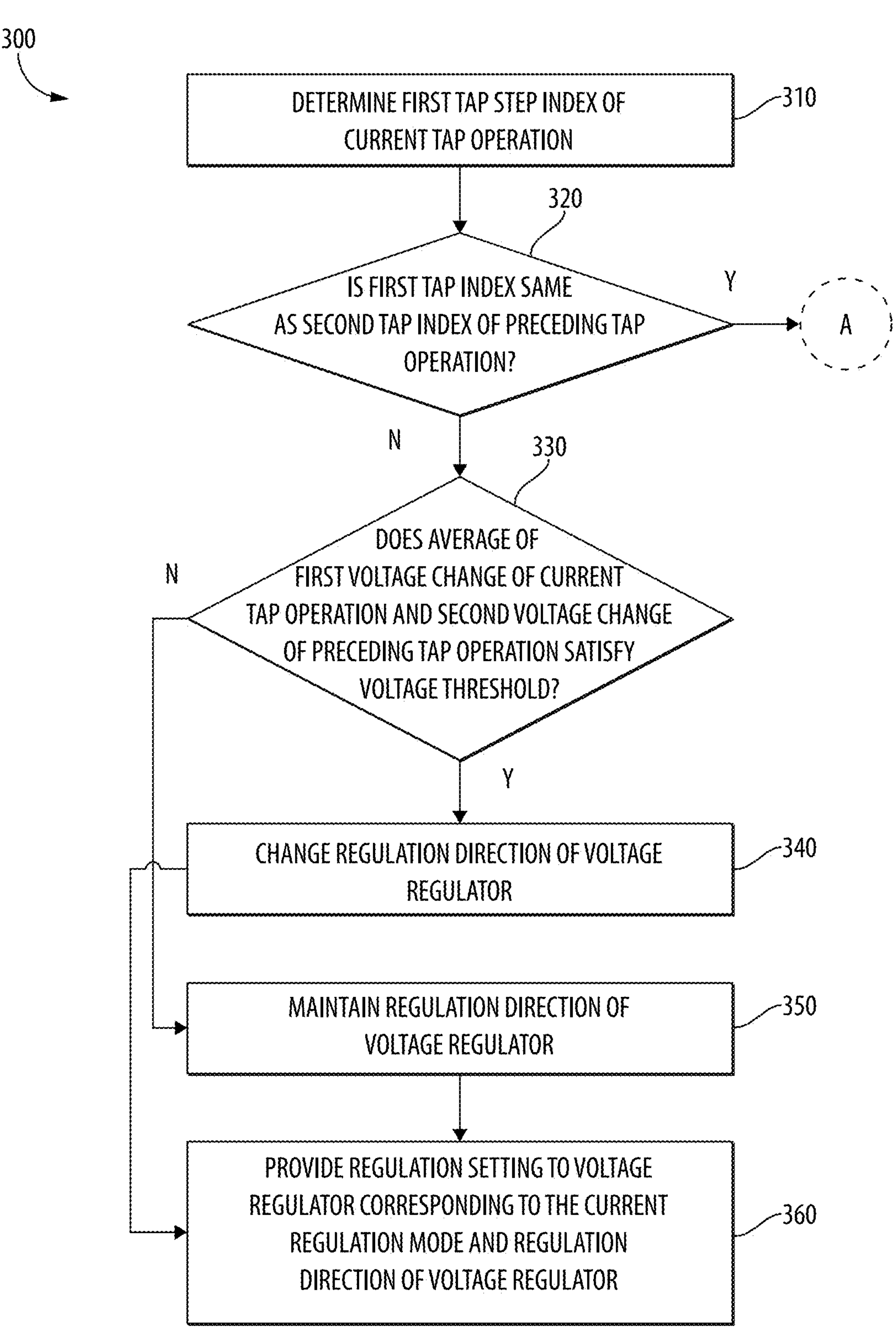
FIG. 3 illustrates a flowchart of a method for identifying proper regulation method for voltage regulators according to some embodiments.

FIG. 3 illustrates a flowchart of an example method 300 for an automatic determination of proper regulation method of the voltage regulator 140. The method 300 may be implemented using, for example, the voltage regulator controller 170. All of the blocks need not be performed and may not be performed in the order recited. In the example illustrated, the method 300 includes determining, using the electronic processor 210, a first tap step index of a current tap operation (at block 310). A tap operation or tap change operation is when the tap position of the voltage regulator 140 is changed from a first position to a second position. The tap operation may be detected using the tap position encoder 280. When a tap operation is detected, the electronic processor 210 determines the tap step index of the tap operation. The tap step index may be determined in various ways. In one example, the voltage regulator controller 170 stores a look-up table correlating each tap step to a corresponding index. The electronic processor 210 refers to the look-up table to determine the tap step index. In another example, the electronic processor 210 determines the tap step index using the formula: Tap Step=(Tap Position+Previous Tap Position+X)/2, where tap position is the current tap position and X is a constant calculated based on the total tap steps. For example, X=Total Tap Steps−1. Taking the thirty-two-tap step example as noted above, the above formula becomes Tap Step=(Tap Position+Previous Tap Position+31)/2. When the calculated tap step is even, then the tap step index is even. When the calculated tap step is odd, then the tap step index is odd.

The method 300 includes determining, using the electronic processor 210, whether the first tap index is same as a second tap index of a preceding tap operation (at block 320). The electronic processor 210 may use variables, for example, tap_step_index and tap_step_index_prec to track the tap step index of current and preceding tap steps. When the electronic processor 210 determines the tap step index of the current tap operation, the electronic processor 210 moves the value stored in the tap_step_index to the tap_step_index_prec and stores the tap step index of the current tap operation in the tap_step_index. The electronic processor 210 may compare the tap step index of the current tap operation to the tap step index of the preceding tap operation to determine whether the first tap index is the same as the second tap index. The electronic processor 210 therefore determines whether the current tap operation is the same as the preceding tap operation. For example, when the preceding tap operation is the tap step 1→2 and the current tap operation is the tap step 2→1, then the current tap operation is the same as the preceding tap operation. The preceding tap operation refers to the tap operation performed immediately before (or previous to) the current tap operation.

In response to the first tap step index being different from the second tap step index (for example, determining that a condition is satisfied), the method 300 includes determining, using the electronic processor 210, whether an average of a first voltage change of the current tap operation and a second voltage change of the preceding tap operation satisfies a voltage threshold (at block 330). The voltage sensor 290 detects a voltage before and after each tap operation. The before and after voltages may be measured to determine the result of voltage regulation. In one example, the voltage sensor 290 always detects the voltage on the load side of the voltage regulator 140 regardless of the regulation mode. In another example, the voltage sensor 290 always detects the voltage on the regulated side of the voltage regulator 140. The electronic processor 210 determines a voltage change by determining the difference between the voltage measured immediately before the tap operation (for example, the voltage causing the tap operation) and after the tap operation (for example, 1 second after tap operation after the tap operation takes effect). The electronic processor 210 may use variables, for example, volt_delta and volt_delta_prec to track the voltage change for current and preceding tap steps. When the electronic processor 210 determines the voltage change of the current tap operation, the electronic processor 210 moves the value stored in the volt_delta to the volt_delta_prec and stores the voltage change of the current tap operation in the volt_delta. The electronic processor 210 averages the voltage change of the current tap operation to the voltage change of the preceding tap operation and compares the average to a voltage threshold (for example, a first voltage threshold). The voltage threshold may be set to 0.7 Volts. As noted above, the voltage change for each tap step may range from 0.4 to 1.0 Volts due to various factors. However, the average of two adjacent tap steps usually remains at 0.7 volts. Apart from blocks 310 and 320, other ways may be used to determine whether the same tap step operation is performed or a different tap step operation is performed. For example, a different condition may be determined to be satisfied before the average voltage change is detected for two tap step operations.

The method 300 includes changing, using the electronic processor 210, regulation direction of the voltage regulator 140 when the average satisfies the voltage threshold (at block 340). When the average satisfies the voltage threshold, the electronic processor 210 determines a change in operating condition of the power distribution system 100 and changes the regulation direction of the voltage regulator 140. For example, when the voltage regulator 140 is operating in a forward regulation mode having a forward regulation direction, the electronic processor 210 switches the regulation mode to reverse regulation mode having a reverse regulation direction. The method 300 includes maintaining, using the electronic processor 210, regulation direction of the voltage regulator 140 when the average does not satisfy the voltage threshold (at block 350). When the average does not satisfy the voltage threshold, the electronic processor 210 does not change the regulation direction of the voltage regulator 140. Satisfying the voltage threshold may include the average being equal to or greater than, greater than, equal to or less than, or less then the voltage threshold depending on the settings selected by a user and the current regulation direction of the voltage regulator 140 as further explained below in methods 500 and 600.

The method 300 includes providing, using the electronic processor 210, regulation settings to the voltage regulator corresponding to the current regulation mode and regulation direction of the voltage regulator (at block 360). The regulation settings for each regulation mode may be selected by the user on a graphical user interface (GUI) of the voltage regulator controller 170 or a connected display. The regulation settings may include, for example, a band center voltage (for example, 120 Volts), a band width of voltage regulation (for example, 5 volts, 10 volts, or the like), a line drop compensation resistance, a line drop compensation reactance, and/or the like. Providing the regulation setting includes the voltage regulator controller 170 controlling the voltage regulator 140 using the regulation settings selected by the user.

Figure 4:
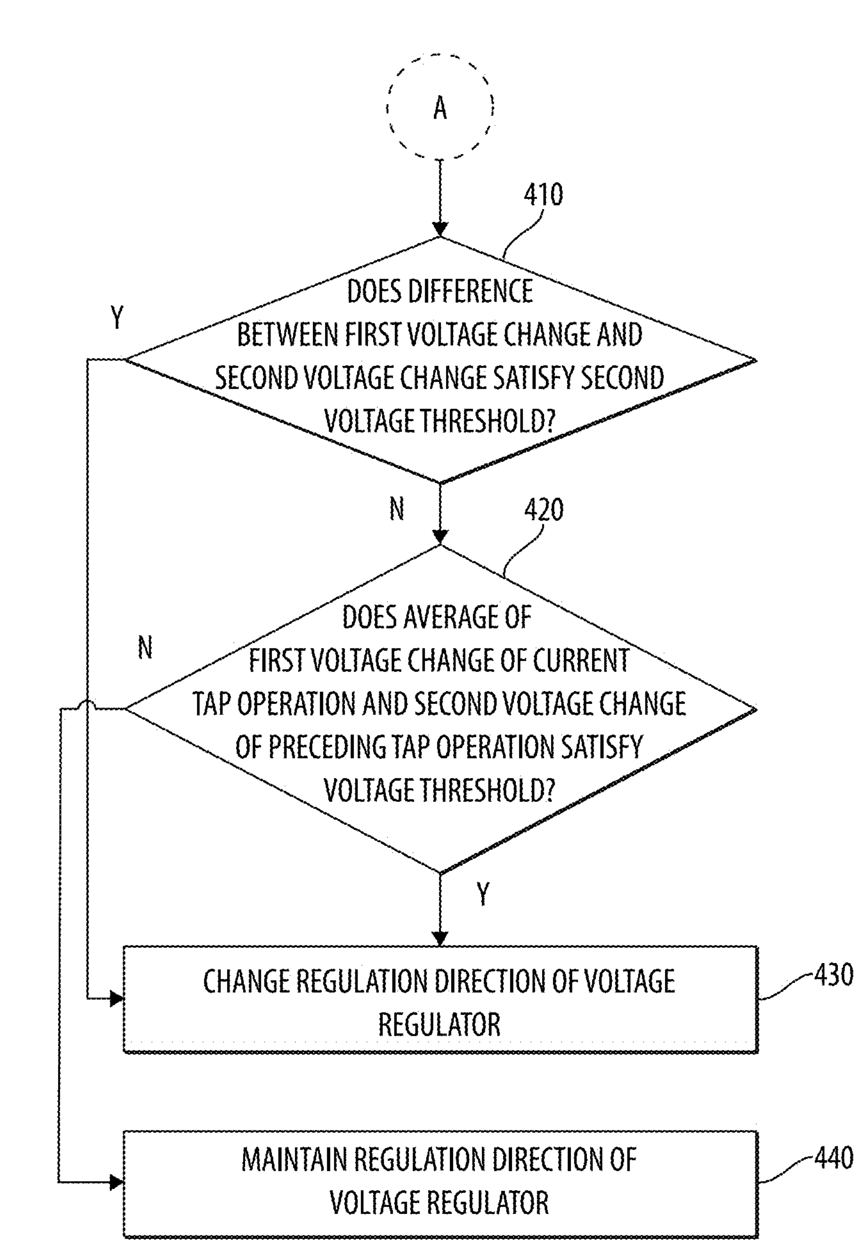
FIG. 4 illustrates a flowchart of a method for identifying proper regulation method for voltage regulators according to some embodiments.

FIG. 4 illustrates a flowchart of an example optional method 400 for an automatic determination of proper regulation method of the voltage regulator 140 when the first tap index is the same as the second tap index as determined in block 320. In the example illustrated, the method 400 includes determining, using the electronic processor 210, whether a difference between the first voltage change and the second voltage change satisfies a second voltage threshold (at block 410). When the current tap operation is the same as the preceding tap operation, that is, the tap step index of the current tap operation is the same as the tap step index of the preceding tap operation, the electronic processor 210 determines the difference between the first voltage change and the second voltage change. The electronic processor 210 compares this difference to a second voltage threshold (for example, 0.7 volts or a value between 0.1 and 0.7 volts).

In response to the difference not satisfying the second voltage threshold (for example, determining that a condition is satisfied), the method 400 includes determining, using the electronic processor 210, whether the average of the first voltage change and the second voltage change satisfies the voltage threshold (at block 420). When the difference satisfies the second voltage threshold or when the average satisfies the voltage threshold, the method 400 includes changing, using the electronic processor 210, regulation direction of the voltage regulator 140 (at block 430). The method 400 includes maintaining, using the electronic processor 210, regulation direction of the voltage regulator 140 when the average does not satisfy the voltage threshold (at block 440). The blocks 420, 430, and 440 may be implemented similar to blocks 330, 340, and 350 of method 300 as described above. The electronic processor 210 may also provide the corresponding regulation settings to the voltage regulator 140.

FIGS. 5A and 5B illustrate a flowchart of an example method 500 for implementing the methods 300 and 400 described above. The method 500 may use different variables to keep track of voltages including four variables each for forward regulation and reverse regulation respectively. The variables include odd_step_fwd (odd tap step in forward regulation), prev_odd_step_fwd (previous odd tap step in forward regulation), even_step_fwd (even tap step in forward regulation), prev_even_step_fwd (previous even tap step in forward regulation), odd_step_rev (odd tap step in reverse regulation), prev_odd_step_rev (previous odd tap step in reverse regulation), even_step_rev (even tap step in reverse regulation), prev_even_step_rev (previous even tap step in reverse regulation). These variables may be initialized at system startup or system reset to default values. In the thirty-two-tap step voltage regulator example as described above, the default values for the variables are shown in Table 1 below.

TABLE 1

| Variable | Default Value (Volts) |
|---|---|
| odd__step__fwd | 0.7 |
| prec__odd__step__fwd | 0.7 |
| even__step__fwd | 0.7 |
| prec__even__step__fwd | 0.7 |
| odd__step__rev | 0.0 |
| prec__odd__step__rev | 0.0 |
| even__step__rev | 0.0 |
| prec__even__step__rev | 0.0 |

The variables correspond to the regulation direction and the tap step index of the tap steps. Each combination of regulation direction and tap step index may include a first variable to store the current voltage change of the tap operation and a second variable to store the previous value of the first variable. For example, when the regulation direction is forward and the tap step index is even, the first variable is even_step_fwd and the second variable is prev_even_step_fwd, when the regulation direction is forward and the tap step index is odd, the first variable is odd_step_fwd and the second variable is prev_odd_step_fwd, and so on.

In the example illustrated, the method 500 includes determining, using the electronic processor 210, a voltage change of a tap operation (at block 502). The voltage sensor 290 measure the voltage and indicates the voltage value to the electronic processor 210. The electronic processor 210 may determine a first voltage just before the tap change operation and determine a second voltage just after the tap change operation. In a preferred example, the second voltage is determined one second after the tap operation. The voltage change of the tap operation is the difference between the first voltage and the second voltage. The voltage change may be determined as an absolute value of the difference between the first voltage and the second voltage. The tap change operation may include one tap step or two tap steps. The tap operation is the current tap operation.

The method 500 includes determining, using the electronic processor 210, a tap step index of the tap operation (at block 504). The tap step index may be determined as described with respect to block 310 of method 300. The method 500 includes determining, using the electronic processor 210, whether the tap operation is same as the preceding tap operation (at block 506). Block 506 may be implemented similar as described with respect to block 320 of method 300.

When the tap operation is different from the preceding tap operation, the method 500 includes determining, using the electronic processor 210, the regulation direction of the voltage regulator 140 (at block 508). The electronic processor 210 may internally track the current regulation direction of the voltage regulator 140. The regulation direction may be forward regulation or reverse regulation. When the regulation direction is forward regulation, the method 500 includes determining whether the tap step index is even or odd (at block 510). As noted above, the electronic processor 210 determines the tap step index at block 504. When the tap step index is odd, the method 500 includes moving, using the electronic processor 210, a value stored in a first variable (e.g., odd_step_fwd) corresponding to forward regulation and odd tap step index to a second variable (e.g., prec_odd_step_fwd) corresponding to forward regulation and odd tap step index and storing the voltage change in the first variable corresponding to forward regulation and odd tap step index (at block 512). When the tap step index is even, the method 500 includes moving, using the electronic processor 210, a value stored in a first variable (e.g., even_step_fwd) corresponding to forward regulation and even tap step index to a second value (e.g., prec_even_step_fwd) corresponding to forward regulation and even tap step index and storing the voltage change in the first variable corresponding to forward regulation and even tap step index (at block 514). The voltage change for the tap step is calculated at block 502.

After blocks 512 and 514, the method 500 includes determining, using the electronic processor, a first average of the first variables corresponding to forward direction (at block 516). For example, the electronic processor 210 determines the average of the values stored in even_step_fwd and odd_step_fwd as the first average. After determining the first average, the method 500 determines, using the electronic processor, whether the first average is below the voltage threshold (at block 518). For a thirty-two tap step voltage regulator 140 as noted above, the average threshold may be set at 0.7 volts.

When the regulation direction is reverse regulation, the method 500 includes determining whether the tap step index is even or odd (at block 520). As noted above, the electronic processor 210 determines the tap step index of the tap operation at block 504. When the tap step index is odd, the method 500 includes moving, using the electronic processor 210, a value stored in a first variable (e.g., odd_step_rev) corresponding to reverse regulation and odd tap step index to a second variable (e.g., prec_odd_step_rev) corresponding to reverse regulation and odd tap step index and storing the voltage change in the first variable corresponding to reverse regulation and odd tap step index (at block 522). When the tap step is even, the method 500 includes moving, using the electronic processor 210, a value stored in a first variable (e.g., even_step_rev) corresponding to reverse regulation and even tap step index to a second variable (e.g., prec_even_step_rev) corresponding to reverse regulation and even tap step index and storing the voltage change in the first variable corresponding to reverse regulation and even tap step index (at block 524). The voltage change for the tap operation is calculated at block 502.

After blocks 522 and 524, the method 500 includes determining, using the electronic processor 210, a second average of the first variables corresponding to reverse direction (at block 526). For example, the electronic processor 210 determines the average of the values stored in even_step_rev and odd_step_rev as the second average. After determining the second average, the method 500 determines, using the electronic processor, whether the second average is above the voltage threshold (at block 528). For a thirty-two tap step voltage regulator 140 as noted above, the average threshold may be set at 0.7 volts.

When the first average is below the voltage threshold or when the second average is above the voltage threshold, the method 500 includes maintaining, using the electronic processor 210, the current regulation mode of the voltage regulator 140 (at block 530). The voltage regulator controller 170 does not take any action when the first average is below the voltage threshold or when the second average is above the voltage threshold.

When the current tap operation is the same as the preceding tap operation, the method 500 includes determining, using the electronic processor 210, a difference between the first voltage change and the second voltage change (at block 532) (see FIG. 5B). When the current tap operation is the same as the preceding tap operation, that is, the tap step index of the current tap operation is the same as the tap step index of the preceding tap operation, the electronic processor 210 determines the difference between the first voltage change and the second voltage change. For example, the electronic processor 210 finds a difference between even_step_fwd and prec_even_step_fwd, a difference between even_step_rev and prec_even_step_rev, a difference between odd_step_fwd and prec_odd_step_fwd, or a difference between odd_step_rev and prec_odd_step_rev depending on the tap step index and regulation direction.

The method 500 includes determining, using the electronic processor 210, whether the difference is greater than the second voltage threshold (at block 534). The electronic processor 210 compares the difference to a second voltage threshold (for example, 0.7 volts or a value between 0.1 and 0.7 volts). In some example, the voltage regulator controller 170 may receive an input to set this second voltage threshold to a different value. For example, the voltage regulator controller 170 receives an input setting the second voltage threshold to a value between 0.1 volts and 0.7 volts.

When the difference is not greater than the second voltage threshold, the method 500 returns to block 508. When the difference is above the second voltage threshold, the method 500 includes determining, using the electronic processor 210, the regulation direction of the voltage regulator 140 (at block 536). The electronic processor 210 may internally track the current regulation direction of the voltage regulator 140. The regulation direction may be forward regulation or reverse regulation.

When the regulation direction is reverse regulation as determined in block 536 or when the second average is above the voltage threshold, the method 500 includes switching, using the electronic processor 210, the regulation direction of the voltage regulator 140 to a forward direction (at block 538). The electronic processor 210 provides an input to switch the regulation mode to the voltage regulator 140.

In response to switching the regulation direction to the forward direction, the method 500 includes resetting, using the electronic processor 210, the first variables and the second variables for the reverse direction (at block 540). The electronic processor 210 resets the variables even_step_rev, prev_even_step_rev, odd_step_rev, and prev_odd_step_rev to the default values as shown in Table 1.

In response to switching the regulation direction to the forward direction, the method 500 also includes determining, using the electronic processor 210, whether the power flow is in the forward direction (at block 542). The voltage regulator controller 170 may internally track the direction of the power flow. As noted in FIGS. 1A-1C, the power flow may be in forward direction during normal operation (e.g., FIG. 1A) and in reverse direction during failure or distributed generation conditions (e.g., FIGS. 1B an 1C).

When the power flow is in the forward direction, the method 500 includes selecting, using the electronic processor 210, forward settings for the regulation mode of the voltage regulator 140 (at block 544). When the power flow is in the reverse direction, the method 500 includes selecting, using the electronic processor 210, distributed generation settings for the regulation mode of the voltage regulator 140 (at block 546).

When the regulation direction is forward regulation as determined in block 532 or when the first average is below threshold, the method 500 includes switching, using the electronic processor 210, the regulation direction of the voltage regulator 140 to a reverse direction (at block 548). The electronic processor 210 provides an input to switch the regulation mode to the voltage regulator 140.

In response to switching the regulation direction to the reverse direction, the method 500 includes resetting, using the electronic processor 210, the first variables and the second variables for the forward direction (at block 550). The electronic processor 210 resets the variables even_step_fwd, prev_even_step_fwd, odd_step_fwd, and prev_odd_step_fwd to the default values as shown in Table 1. In response to switching the regulation direction to the reverse direction, the method 500 also includes selecting, using the electronic processor 210, reverse settings for the regulation mode of the voltage regulator 140 (at block 552).

FIGS. 6A and 6B illustrate a flowchart of an example method 600 for implementing the methods 300 and 400 described above. The method 600 may be similar to method 500 with like steps denoted by like numerals. The method 600 may use different variables, similar to method 500, to keep track of voltages including four variables each for forward regulation and reverse regulation respectively. These variables may be initialized at system startup or system reset to default values. In the thirty-two-tap step voltage regulator example as described above, the default values for the variables are shown in Table 2 below.

TABLE 2

| Variable | Default Value (Volts) |
|---|---|
| odd_step_fwd | 0.7 |
| prec_odd_step_fwd | 0.7 |
| even_step_fwd | 0.7 |
| prec_even_step_fwd | 0.7 |
| odd_step_rev | 0.7 |
| prec_odd_step_rev | 0.7 |
| even_step_rev | 0.7 |
| prec_even_step_rev | 0.7 |

In the example illustrated, the method 600 includes determining, using the electronic processor 210, a voltage change of a tap operation (at block 502). The method 600 includes determining, using the electronic processor 210, a tap step index of the tap operation (at block 504). The method 600 includes determining, using the electronic processor 210, whether the tap operation is same as the preceding tap operation (at block 506). Block 506 may be implemented similar as described with respect to block 320 of method 300.

When the tap operation is different from the preceding tap operation, the method 600 includes determining, using the electronic processor 210, the regulation direction of the voltage regulator 140 (at block 508). When the regulation direction is forward regulation, the method 600 includes determining whether the tap step index is even or odd (at block 510). When the tap step index is odd, the method 600 includes moving, using the electronic processor 210, a value stored in a first variable (e.g., odd_step_fwd) corresponding to forward regulation and odd tap step index to a second variable (e.g., prec_odd_step_fwd) corresponding to forward regulation and odd tap step index and storing the voltage change in the first variable corresponding to forward regulation and odd tap step index (at block 512). When the tap step index is even, the method 600 includes moving, using the electronic processor 210, a value stored in a first variable (e.g., even_step_fwd) corresponding to forward regulation and even tap step index to a second value (e.g., prec_even_step_fwd) corresponding to forward regulation and even tap step index and storing the voltage change in the first variable corresponding to forward regulation and even tap step index (at block 514).

After blocks 512 and 514, the method 600 includes determining, using the electronic processor 210, a first average of the first variables corresponding to forward direction (at block 516). After determining the first average, the method 600 determines, using the electronic processor, whether the first average is below the voltage threshold (at block 518). When the regulation direction is reverse regulation, the method 600 includes determining whether the tap step index is even or odd (at block 520). When the tap step index is odd, the method 600 includes moving, using the electronic processor 210, a value stored in a first variable (e.g., odd_step_rev) corresponding to reverse regulation and odd tap step index to a second variable (e.g., prec_odd_step_rev) corresponding to reverse regulation and odd tap step index and storing the voltage change in the first variable corresponding to reverse regulation and odd tap step index (at block 522). When the tap step is even, the method 600 includes moving, using the electronic processor 210, a value stored in a first variable (e.g., even_step_rev) corresponding to reverse regulation and even tap step index to a second variable (e.g., prec_even_step_rev) corresponding to reverse regulation and even tap step index and storing the voltage change in the first variable corresponding to reverse regulation and even tap step index (at block 524).

After blocks 522 and 524, the method 600 includes determining, using the electronic processor 210, a second average of the first variables corresponding to reverse direction (at block 526). After determining the second average, the method 600 determines, using the electronic processor, whether the second average is below the voltage threshold (at block 602).

When the first average is below the voltage threshold or when the second average is below the voltage threshold, the method 600 includes maintaining, using the electronic processor 210, the current regulation mode of the voltage regulator 140 (at block 530). When the current tap operation is the same as the preceding tap operation, the method 600 includes determining, using the electronic processor 210, a difference between the first voltage change and the second voltage change (at block 532) (see FIG. 6B).

The method 600 includes determining, using the electronic processor 210, whether the difference is greater than the second voltage threshold (at block 534). When the difference is not greater than the second voltage threshold, the method 600 returns to block 508. When the difference is above the second voltage threshold, the method 600 includes determining, using the electronic processor 210, the regulation direction of the voltage regulator 140 (at block 536).

When the regulation direction is reverse regulation as determined in block 536 or when the second average is below the voltage threshold, the method 600 includes switching, using the electronic processor 210, the regulation direction of the voltage regulator 140 to a forward direction (at block 538). In response to switching the regulation direction to the forward direction, the method 600 includes switching, using the electronic processor 210, voltage detection to load side of the voltage regulator 140 (at block 604). The voltage regulator controller 170 controls the voltage sensor 290 to measure the voltage on the load side for the next iteration of the method 600.

In response to switching the regulation direction to the forward direction, the method 600 also includes resetting, using the electronic processor 210, the first variables and the second variables for the reverse direction (at block 540). The electronic processor 210 resets the variables even_step_rev, prev_even_step_rev, odd_step_rev, and prev_odd_step_rev to the default values as shown in Table 2. In response to switching the regulation direction to the forward direction, the method 600 also includes determining, using the electronic processor 210, whether the power flow is in the forward direction (at block 542).

When the power flow is in the forward direction, the method 600 includes selecting, using the electronic processor 210, forward settings for the regulation mode of the voltage regulator 140 (at block 544). When the power flow is in the reverse direction, the method 600 includes selecting, using the electronic processor 210, distributed generation settings for the regulation mode of the voltage regulator 140 (at block 546).

When the regulation direction is forward regulation as determined in block 532 or when the first average is below threshold, the method 600 includes switching, using the electronic processor 210, the regulation direction of the voltage regulator 140 to a reverse direction (at block 548). In response to switching the regulation direction to the forward direction, the method 600 includes switching, using the electronic processor 210, voltage detection to source side of the voltage regulator 140 (at block 606). The voltage regulator controller 170 controls the voltage sensor 290 to measure the voltage on the source side for the next iteration of the method 600.

In response to switching the regulation direction to the reverse direction, the method 300 includes resetting, using the electronic processor 210, the first variables and the second variables for the forward direction (at block 550). The electronic processor 210 resets the variables even_step_fwd, prev_even_step_fwd, odd_step_fwd, and prev_odd_step_fwd to the default values as shown in Table 2. In response to switching the regulation direction to the reverse direction, the method 300 also includes selecting, using the electronic processor 210, reverse settings for the regulation mode of the voltage regulator 140 (at block 552).

Thus, aspects described herein provide, among other things, methods and apparatus for identifying proper regulation method based on average voltage change between tap steps for voltage regulators. Various features and advantages are set forth in the following claims.

What is claimed is:

1. A voltage regulator controller for controlling a voltage regulator of a power distribution system, the voltage regulator controller comprising:

an electronic processor configured to in response to a condition being satisfied determine whether an average of a first voltage change of a current tap operation and a second voltage change of a preceding tap operation satisfies a voltage threshold, change a regulation direction of the voltage regulator when the average satisfies the voltage threshold, and maintain the regulation direction of the voltage regulator when the average does not satisfy the voltage threshold; and provide regulation settings to the voltage regulator corresponding to a current regulation mode and the regulation direction of the voltage regulator.

2. The voltage regulator controller of claim 1, wherein the electronic processor is configured to when changing the regulation direction from a reverse direction to a forward direction determine a direction of power flow;

provide forward regulation mode settings to the voltage regulator when the power flow direction is forward; and provide distributed generation mode settings to the voltage regulator when the power flow direction is reverse.

3. The voltage regulator controller of claim 1, wherein the regulation settings include one or more selected from a group consisting of a band center voltage, a band width of voltage regulation, a line drop compensation resistance, and a line drop compensation reactance.

4. The voltage regulator controller of claim 1, wherein the electronic processor is configured to determine that the condition is satisfied in response to a first tap step index of the current tap operation being different from a second tap step index of the preceding tap operation.

5. The voltage regulator controller of claim 4, wherein the voltage threshold is a first voltage threshold, wherein the electronic processor is configured to in response to the first tap step index being same as the second tap step index determine whether a difference between the first voltage change and the second voltage change satisfies a second voltage threshold, change the regulation direction of the voltage regulator when the difference satisfies the second voltage threshold, and determine that the condition is satisfied when the difference does not satisfy the second voltage threshold.

6. The voltage regulator controller of claim 5, wherein the first tap step index and the second tap step index indicate whether a corresponding tap step was even or odd, wherein each alternative tap step of the voltage regulator are denoted as odd tap steps and remaining tap steps of the voltage regulator are denoted as even tap steps.

7. The voltage regulator controller of claim 1, wherein the electronic processor is configured to switch a voltage measurement side of the voltage regulator when changing the regulation direction.

8. A method for controlling a voltage regulator of a power distribution system, the method comprising:

in response to a condition being satisfied determining whether an average of a first voltage change of a current tap operation and a second voltage change of a preceding tap operation satisfies a voltage threshold, changing a regulation direction of the voltage regulator when the average satisfies the voltage threshold, and maintaining the regulation direction of the voltage regulator when the average does not satisfy the voltage threshold; and providing regulation settings to the voltage regulator corresponding to a current regulation mode and the regulation direction of the voltage regulator.

9. The method of claim 8, further comprising:

when changing the regulation direction from a reverse direction to a forward direction determining a direction of power flow;

providing forward regulation mode settings to the voltage regulator when the power flow direction is forward; and providing distributed generation mode settings to the voltage regulator when the power flow direction is reverse.

10. The method of claim 8, wherein the regulation settings include one or more selected from a group consisting of a band center voltage, a band width of voltage regulation, a line drop compensation resistance, and a line drop compensation reactance.

11. The method of claim 8, further comprising:

determining that the condition is satisfied in response to a first tap step index of the current tap operation being different from a second tap step index of the preceding tap operation.

12. The method of claim 11, wherein the voltage threshold is a first voltage threshold, further comprising:

in response to the first tap step index being same as the second tap step index determining whether a difference between the first voltage change and the second voltage change satisfies a second voltage threshold, changing the regulation direction of the voltage regulator when the difference satisfies the second voltage threshold, and determining that the condition is satisfied when the difference does not satisfy the second voltage threshold.

13. The method of claim 12, wherein the first tap step index and the second tap step index indicate whether a corresponding tap step was even or odd, wherein each alternative tap step of the voltage regulator are denoted as odd tap steps and remaining tap steps of the voltage regulator are denoted as even tap steps.

14. The method of claim 8, further comprising:

switching a voltage measurement side of the voltage regulator when changing the regulation direction.

15. A voltage regulator controller for controlling a voltage regulator of a power distribution system, the voltage regulator controller comprising:

an electronic processor configured to in response to a first tap step index of a current tap operation being different from a second tap step index of a preceding tap operation determine whether an average of a first voltage change of the current tap operation and a second voltage change of the preceding tap operation satisfies a voltage threshold, change a regulation direction of the voltage regulator when the average satisfies the voltage threshold, and maintain the regulation direction of the voltage regulator when the average does not satisfy the voltage threshold.

16. The voltage regulator controller of claim 15, wherein the first tap step index and the second tap step index indicate whether a corresponding tap step was even or odd, wherein each alternative tap step of the voltage regulator are denoted as odd tap steps and remaining tap steps of the voltage regulator are denoted as even tap steps.

17. The voltage regulator controller of claim 15, wherein the electronic processor is configured to when changing the regulation direction from a reverse direction to a forward direction determine a direction of power flow;

provide forward regulation mode settings to the voltage regulator when the power flow direction is forward; and provide distributed generation mode settings to the voltage regulator when the power flow direction is reverse.

18. The voltage regulator controller of claim 15, wherein the electronic processor is configured to provide regulation settings include one or more selected from a group consisting of a band center voltage, a band width of voltage regulation, a line drop compensation resistance, and a line drop compensation reactance to the voltage regulator.

19. The voltage regulator controller of claim 15, wherein the voltage threshold is a first voltage threshold, wherein the electronic processor is configured to in response to the first tap step index being same as the second tap step index determine whether a difference between the first voltage change and the second voltage change satisfies a second voltage threshold, change the regulation direction of the voltage regulator when the difference satisfies the second voltage threshold, and when the difference does not satisfy the second voltage threshold determine whether the average satisfies the first voltage threshold, change the regulation direction of the voltage regulator when the average satisfies the first voltage threshold, and maintain the regulation direction of the voltage regulator when the average does not satisfy the first voltage threshold.

20. The voltage regulator controller of claim 15, wherein the electronic processor is configured to switch a voltage measurement side of the voltage regulator when changing the regulation direction.

* * * * *